US012711589B2

(12) United States Patent
Park et al.

(10) Patent No.: US 12,711,589 B2
(45) Date of Patent: Aug. 18, 2026

(54) METHOD AND SYSTEM FOR PROVIDING VEHICLE EXTERIOR DAMAGE DETERMINATION SERVICE

(71) Applicant: HYUNDAI MOBIS CO., LTD., Seoul (KR)

(72) Inventors: Yeong Hun Park, Seoul (KR); Ki Hee Park, Gwacheon-si (KR); Yu Jin Jung, Seoul (KR); June Seung Lee, Gunpo-si (KR); Hyun Jun Lim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 305 days.

(21) Appl. No.: 18/348,750

(22) Filed: Jul. 7, 2023

(65) Prior Publication Data

US 2024/0104709 A1 Mar. 28, 2024

(30) Foreign Application Priority Data

Sep. 27, 2022 (KR) ........................ 10-2022-0122469

(51) Int. Cl.
*G06T 7/00* (2017.01)
*G06T 7/10* (2017.01)

(52) U.S. Cl.
CPC .............. *G06T 7/0002* (2013.01); *G06T 7/10* (2017.01); *G06T 2207/10028* (2013.01); *G06T 2207/20081* (2013.01); *G06T 2207/30252* (2013.01)

(58) Field of Classification Search
CPC ..................... G06T 7/0002; G06T 7/10; G06T 2207/10028; G06T 2207/20081; G06T 2207/30252; G06T 2207/10024; G06T 2207/20084; G06T 2207/30156; G06T 7/001; G06T 7/0004; G06T 7/11; G06T 7/30; G06T 7/50; G06T 7/90; G06Q 50/40
See application file for complete search history.

(56) References Cited

U.S. PATENT DOCUMENTS 12,020,217 B2 * 6/2024 Gandhi .................. G06N 3/045
2018/0260793 A1 * 9/2018 Li .......................... G06Q 40/08
2022/0114627 A1 * 4/2022 Tomlinson ......... G06Q 10/0875
2022/0284544 A1 * 9/2022 Holzer .................. G06T 3/4038
2023/0153975 A1 * 5/2023 Lutich .................. G06T 7/0004 382/141

* cited by examiner

*Primary Examiner* — Tom Y Lu
(74) *Attorney, Agent, or Firm* — NSIP Law

(57) ABSTRACT

A processor implemented method including outputting guide information to guide a capture of an image of a predetermined area via a camera of a mobile terminal including the processor, inputting a first exterior image of a vehicle, the first exterior image being captured based on the output guide information and a second exterior image of the vehicle stored in advance to a processor including a deep learning model, matching the first exterior image and the second exterior image with each other to acquire a matched image, masking a detected area from the predetermined image within the matched image as a masked area, and determining whether an exterior of the vehicle has been damaged and a type of damage based on the masked area.

22 Claims, 6 Drawing Sheets

FIG. 2

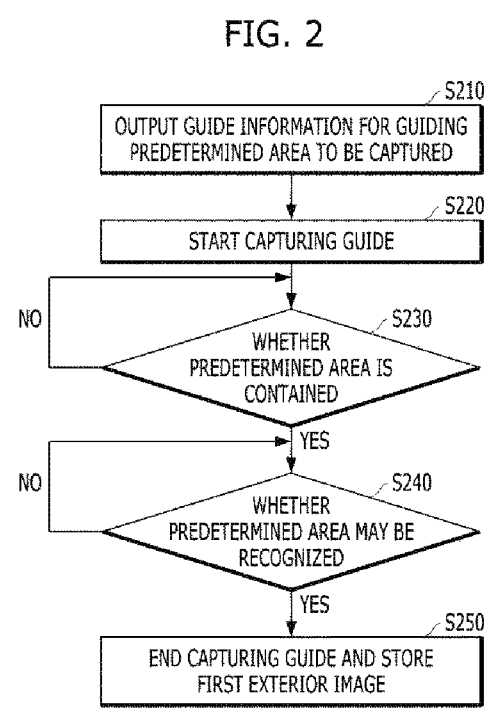

S210 OUTPUT GUIDE INFORMATION FOR GUIDING PREDETERMINED AREA TO BE CAPTURED

S220 START CAPTURING GUIDE

S230 WHETHER PREDETERMINED AREA IS CONTAINED

NO

YES

S240 WHETHER PREDETERMINED AREA MAY BE RECOGNIZED

NO

YES

S250 END CAPTURING GUIDE AND STORE FIRST EXTERIOR IMAGE (a)

(b)

METHOD AND SYSTEM FOR PROVIDING VEHICLE EXTERIOR DAMAGE DETERMINATION SERVICE

This application claims the benefit 35 USC § 119(a) of Korean Patent Application No. 10-2022-0122469, filed on Sep. 27, 2022, the entire disclosure of which is incorporated herein by reference for all purposes.

BACKGROUND

1. Field

The present disclosure relates to a method and a system for providing a vehicle exterior damage determination service, and specifically, to a method and a system for providing a vehicle exterior damage determination service for determining whether an exterior of a vehicle has been damaged and a type of damage using a deep learning model on an exterior image of the vehicle captured via a mobile terminal and an exterior image of the vehicle stored in advance in a situation where a driver of the same vehicle is changed.

2. Discussion of the Related Art

Many people use a rental car service, and use a valet service of parking a vehicle instead of a driver of the vehicle when parking the vehicle in a complex place with many vehicles, such as a hotel, an airport, a restaurant, and a lodging facility. In the case of such a rental car or valet service, because the driver of the vehicle is changed for a short period of time for the same vehicle, to prevent a dispute that may occur in a process of handing over the vehicle in advance, the driver of the vehicle must check whether there is any abnormality on an exterior of the vehicle in advance before driving the vehicle.

In general, the driver captures an image of the exterior of the vehicle in advance via a mobile terminal that the driver carries before driving the vehicle. However, in this case, the driver has to capture the image while checking each portion of the exterior of the vehicle by himself/herself, which is inconvenient. In addition, a lot of time is required to capture the image because the driver does not know an area where damage to the exterior easily occurs and thus not know which area of the exterior to be captured.

In addition, a damaged portion that is difficult to identify with the naked eye, such as a fine scratch or dent in the exterior of the vehicle, is sometimes overlooked without being found while capturing the image. Therefore, when the dispute occurs about the damage to the exterior of the vehicle in the process of handing over the vehicle, a problem in that a former driver cannot prove his/her innocence properly occurs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method including outputting guide information to guide an image to be captured of a predetermined area via a camera of a mobile terminal including the processor, inputting a first exterior image of a vehicle, the first exterior image being captured based on the output guide information and a second exterior image of the vehicle stored in advance to a deep learning model, matching the first exterior image and the second exterior image with each other to acquire a matched image, masking a detected area from the predetermined image within the matched image as a masked area, and determining whether an exterior of the vehicle has been damaged and a type of damage based on the masked area.

The guide information may include one or more of information on whether the predetermined area is contained in a first area captured by the camera and information on whether the predetermined area is recognized and stored as the first exterior image.

The first exterior image input to the processor may include an RGB image and a depth image.

The camera may include a time of flight (ToF) camera configured to capture the depth image.

The predetermined area may be one of a second area with a high possibility of damage to the exterior of the vehicle and a third area where the exterior of the vehicle has been impacted acquired via a sensor of the vehicle.

The second area may include a fourth area where a distance to an external object measured during travel of the vehicle is less than or equal to a reference distance.

The sensor of the vehicle may include one or more of a radar sensor, a bumper sensor, and a camera sensor.

The determination of whether the exterior of the vehicle has been damaged and the type of damage may include states of normal, scratched, dented, cracked, and opened.

The determining of whether the exterior of the vehicle has been damaged and the type of damage may include generating a probability map from the matched image via image segmentation, determining whether the exterior of the vehicle has been damaged via the generated probability map, and performing masking in pixel units for each type of damage to extract the masking result as damage characteristics information.

The deep learning model may be further trained based on the damage characteristics information.

The method may include outputting the determination of whether the exterior of the vehicle has been damaged and the determined type of damage via an output device of the mobile terminal.

The outputting may include transmitting the determination of whether the exterior of the vehicle has been damaged and the determined type of damage via a wireless communication transceiver.

In a general aspect, here is provided an electronic system including a camera mounted on a mobile terminal, an output device configured to output guide information to guide a capture of a predetermined area via the camera, and a processor configured to input a first exterior image of a vehicle captured based on the output guide information and a second exterior image of the vehicle stored in advance to a deep learning model, match the first exterior image and the second exterior image to acquire a matched image, masking a detected area based on a match between the predetermined area and the matched image as a masked area, and determine whether an exterior of the vehicle has been damaged and a type of damage based on the masked area.

The guide information may include one or more of information on whether the predetermined area is contained in a first area captured by the camera and information on whether the predetermined area is recognized and stored as the exterior image of the vehicle.

The first exterior image input to the processor may include an RGB image and a depth image, wherein the camera may include a time of flight (ToF) camera configured to capture the depth image.

The predetermined area may be one of a second area with a high possibility of damage to the exterior of the vehicle and a third area where the exterior of the vehicle has been impacted acquired via a sensor of the vehicle.

The second area may include a fourth area where a distance to an external object measured during travel of the vehicle is less than or equal to a reference distance.

The determination of whether the exterior of the vehicle has been damaged and the type of damage may include states of normal, scratched, dented, cracked, and opened.

The determining of whether the exterior of the vehicle has been damaged and the type of damage may include generating a probability map from the matched image via image segmentation, determining whether the exterior of the vehicle has been damaged via the generated probability map, and performing masking in pixel units for each type of damage to extract the masking result as damage characteristics information.

The deep learning model may be trained based on the damage characteristics information.

The system may include a central management server configured to transmit the determination of whether the exterior of the vehicle has been damaged and the determined type of damage via a wireless communication transceiver.

The output device may be configured to output the determination of whether the exterior of the vehicle has been damaged and the determined type of damage.

Other features and aspects will be apparent from the following detailed description, the drawings, and the claims.

In a general aspect, here is provided a processor-implemented method including outputting guide information to direct a motion of a camera of a mobile terminal including the processor to capture an of a predetermined area via, training a machine learning model on a first exterior image of a vehicle, the first exterior image being captured based on the output guide information and a second exterior image of an the vehicle, the second image being of an undamaged version of the vehicle, masking an area from the from the first image that matches the second image; and determining whether an exterior of the vehicle has been damaged and a type of damage based on the masked area.

The guide information may be output as one of a voice command or display images.

BRIEF DESCRIPTION OF THE DRAWINGS

FIG. 2 is a diagram for illustrating guide information for guiding a predetermined area to be captured in a vehicle exterior damage determination service providing method according to an embodiment of the present disclosure.

Figure 1:
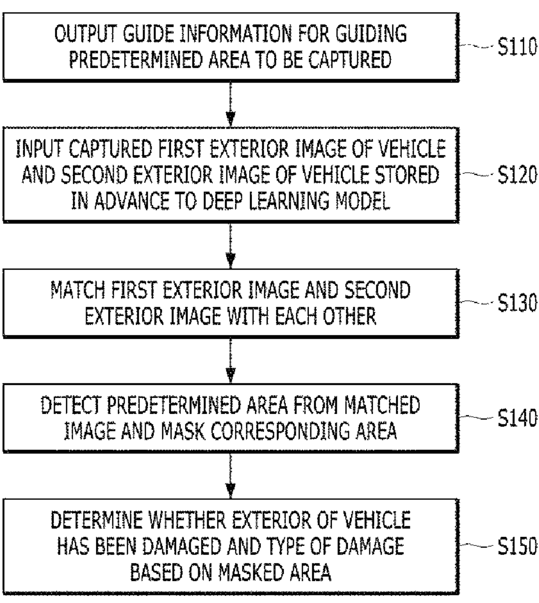
FIG. 1 is a diagram for illustrating a vehicle exterior damage determination service providing method according to an embodiment of the present disclosure.

Throughout the drawings and the detailed description, unless otherwise described or provided, it may be understood that the same drawing reference numerals refer to the same, or like, elements, features, and structures. The drawings may not be to scale, and the relative size, proportions, and depiction of elements in the drawings may be exaggerated for clarity, illustration, and convenience.

DESCRIPTION OF SPECIFIC EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a diagram for illustrating a vehicle exterior damage determination service providing method according to an embodiment of the present disclosure.

First, guide information for guiding a predetermined area to be captured via a camera of the mobile terminal may be output (S110). In this regard, the predetermined area may be an area learned in advance via a deep learning model according to one embodiment of the present disclosure, and may include an area with a high possibility of damage to an exterior of a vehicle or an area where the exterior of the vehicle has been impacted acquired via a sensor of the vehicle by a former user of a service such as rental or valet while driving the vehicle. Therefore, the predetermined area may be a region of interest (ROI) acquired via the sensor of the vehicle during travel of the vehicle or provided via an image captured by the former user via the camera of the mobile terminal.

In this regard, a deep learning technology is a technology of performing at least one of learning, judgment, and processing of information using an artificial neural network algorithm. This is defined as a set of machine learning algorithms that attempt a high level of abstraction via a combination of several non-linear transformation methods, and is a field of machine learning that teaches computers how people think in a large frame.

In addition, the artificial neural network may have a structure that connects layers to each other and transmits data between the layers. Such deep learning technology may allow vast amounts of information to be learned via the artificial neural network.

In this regard, the area with the high possibility of damage to the exterior of the vehicle may include an area where a distance to an external object measured during the travel of the vehicle is equal to or smaller than a reference distance. The distance between the vehicle and the external object may be acquired via a sensor mounted on the vehicle, such as a radar sensor, a lidar sensor, and a camera sensor.

As described above, as the area with the high possibility of damage to the exterior of the vehicle is output via the mobile terminal and guided to be captured via the camera of the mobile terminal, inconvenience of a driver of the vehicle having to capturing the image while checking each portion of the exterior of the vehicle by himself/herself and a problem of not knowing an area where the damage to the exterior may easily occur and thus passing the corresponding area without capturing may be solved.

In addition, the area where the exterior of the vehicle has been impacted may be acquired via the sensor mounted on the vehicle, such as a bumper sensor and an impact detection sensor.

In this regard, the predetermined area including the area with the high possibility of damage to the exterior of the vehicle and the area where the exterior of the vehicle has been impacted may be learned via the deep learning model according to one embodiment of the present disclosure, and learned by accumulating a difference with a probability map on whether the exterior of the vehicle has been damaged and the type of damage determined via the image provided from the former user of the vehicle.

A first exterior image of the vehicle captured via the camera of the mobile terminal based on the guide information output via the mobile terminal and a second exterior image of the vehicle stored in advance may be input by a processor including the deep learning model (S120). In this regard, the second exterior image of the vehicle stored in advance may include an exterior image of the vehicle before handing over the vehicle when using the service such as the rental or the valet.

In addition, the deep learning model according to one embodiment of the present disclosure may match the input first exterior image and second exterior image with each other (S130), and detect the above-described predetermined area from the matched image and mask the corresponding area (S140). In addition, based on the masked area, whether the exterior of the vehicle has been damaged and the type of damage may be determined (S150). In this regard, whether the exterior of the vehicle has been damaged and the type of damage determined via the deep learning model may be determined including states of normal, scratched, dented, cracked, and opened.

FIG. 2 is a diagram for illustrating guide information for guiding a predetermined area to be captured in a vehicle exterior damage determination service providing method according to an embodiment of the present disclosure.

When the guide information that guides the predetermined area to be captured via the camera of the mobile terminal is output (S210), a capturing guide may be started (S220). In this regard, the guide information may be output on a screen via a display of the mobile terminal, or may also be output as voice via a sound output device of the mobile terminal.

When the capturing guide starts, first, information on whether the predetermined area is contained may be output via the camera of the mobile terminal (S230). When the predetermined area is contained, information on whether the predetermined area may be recognized may be output (S240).

More specifically, the above-described capturing guide may induce a capturing mode of a damaged portion corresponding to the predetermined area on the exterior of the vehicle to be activated manually, induce a distance to the vehicle to be gradually adjusted from a far distance to a near distance semi-automatically by measuring the distance in an infrared scheme, or allow the camera of the mobile terminal to recognize a current screen and automatically adjust the distance and a position of the vehicle. In addition, when it is required to capture the image by zooming in depending on the state of the exterior of the vehicle, the image may be guided to be captured by being zoomed in.

When the capturing guide that guides the predetermined area to be captured ends, the first exterior image of the vehicle captured based on the guide information may be stored (S250). Therefore, the vehicle exterior damage determination service providing method according to the present disclosure may provide the guide information necessary for capturing the exterior of the vehicle before the driver of the vehicle drives the vehicle to prevent a dispute that may occur in the process of handing over the vehicle in advance when the driver of the vehicle is changed for a short period of time for the same vehicle, such as in the rental car or valet service. Accordingly, the inconvenience of the driver of the vehicle having to capturing the image while checking each portion of the exterior of the vehicle by himself/herself and the problem of not knowing the area where the damage to the exterior may easily occur and thus passing the corresponding area without capturing may be solved.

Figure 3:
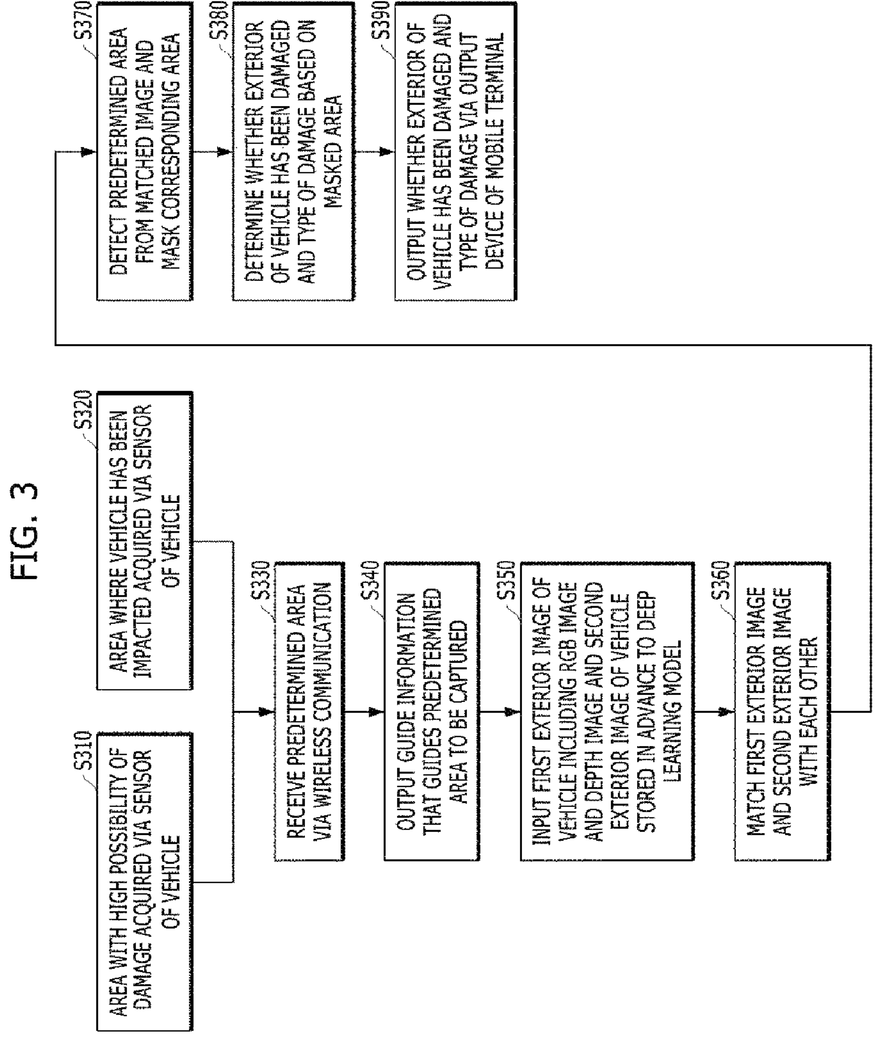
FIG. 3 is a diagram for illustrating another embodiment of a vehicle exterior damage determination service providing method of the present disclosure.

FIG. 3 is a diagram for illustrating another embodiment of a vehicle exterior damage determination service providing method of the present disclosure.

First, information on the area (S310) with the high possibility of damage to the vehicle and the area (S320) where the vehicle has been impacted may be acquired via the sensor of the vehicle during the travel of the vehicle. In this regard, the area with the high possibility of damage and the area where the vehicle has been impacted may correspond to the above-mentioned predetermined area. In addition, the predetermined area may be transmitted via wireless communication and received by the mobile terminal (S330). In addition, the predetermined area acquired via the sensor of the vehicle may also be learned by the deep learning model of the present disclosure.

Then, the guide information that guides the predetermined area to be captured may be output (S340). In this regard, the guide information may include at least one of information on whether the predetermined area is contained in an area captured by the camera of the mobile terminal and information on whether the predetermined area may be recognized and stored as the first exterior image.

In this regard, the camera of the mobile terminal may include a general camera for capturing an RGB image and a time of flight (ToF) camera for capturing a depth image. In this regard, a ToF is the time it takes for an infrared beam to be irradiated to a target, reflected, and returned to an origin, and the ToF camera refers to a three-dimensional imaging device that uses grid array electronic eyes in which the number of infrared detecting elements varies based on the number of pixels to convert the infrared beam into an electronic signal.

The first exterior image of the vehicle captured based on the output guide information may include the RGB image and the depth image captured via the ToF camera, and the first exterior image and the second exterior image of the vehicle stored in advance may be input to the processor including the deep learning model (S350).

In addition, the first exterior image and the second exterior image may be matched with each other via the deep learning model of the present disclosure (S360), the predetermined area may be detected from the matched image and masked (S370), and whether the exterior of the vehicle has been damaged and the type of damage may be determined based on the masked area (S380).

Whether the exterior of the vehicle has been damaged and the type of damage determined may be output via an output device of the mobile terminal (S390). In this regard, the output device of the mobile terminal may include the display for outputting the screen and the sound output device for outputting sound. In addition, whether the exterior of the vehicle has been damaged and the type of damage determined may be transmitted via the wireless communication.

Figure 4:
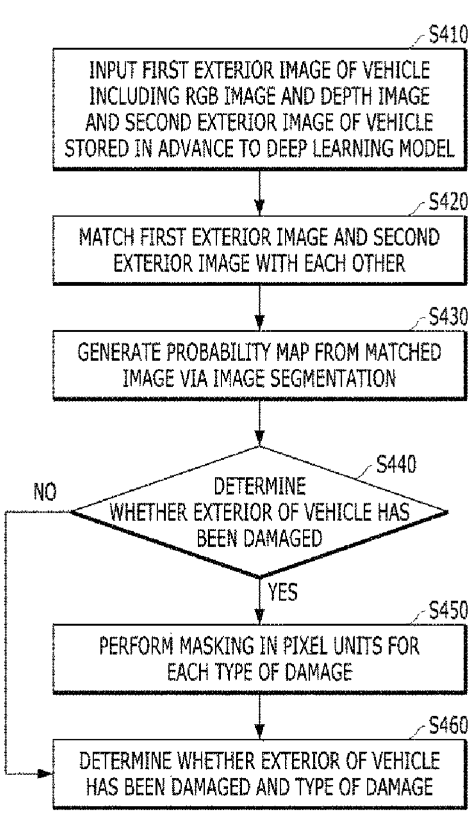
FIG. 4 is a diagram for illustrating a deep learning model in a vehicle exterior damage determination service providing method according to an embodiment of the present disclosure.
Figure 5:
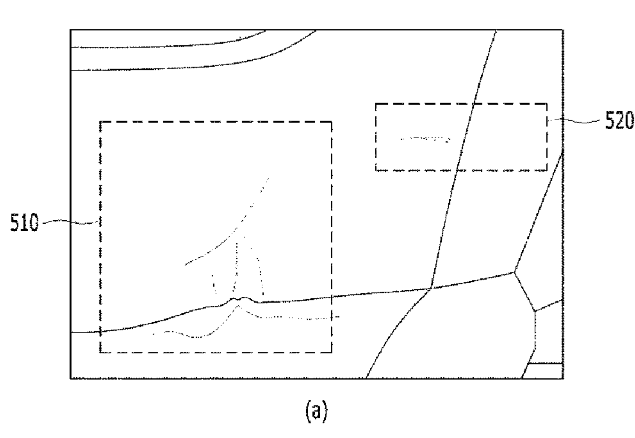
FIG. 5 is a diagram for illustrating whether an exterior of a vehicle has been damaged and a type of damage in a vehicle exterior damage determination service providing method according to an embodiment of the present disclosure.
Figure 5:
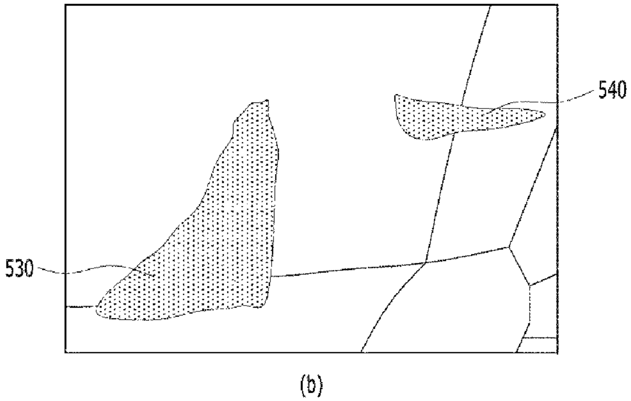

FIG. 4 is a diagram for illustrating a deep learning model in a vehicle exterior damage determination service providing method according to an embodiment of the present disclosure. FIG. 5 is a diagram for illustrating whether an exterior of a vehicle has been damaged and a type of damage in a vehicle exterior damage determination service providing method according to an embodiment of the present disclosure.

First, the first exterior image of the vehicle including the RGB image and the depth image acquired via the camera of the mobile terminal according to one embodiment of the present disclosure and the second exterior image of the vehicle stored in advance may be input to the deep learning model (S410).

The deep learning model of the present disclosure may match the input first exterior image and second exterior image with each other (S420). The probability map may be generated from the matched image via image segmentation (S430).

In this regard, in the vehicle exterior damage determination service providing method according to one embodiment of the present disclosure, whether the exterior of the vehicle has been damaged and the type of damage may be determined in pixel units via a data conversion scheme of thresholding or the like on the generated probability map. Therefore, whether the exterior of the vehicle has been damaged may be determined via the generated probability map (S440), the masking may be performed in the pixel units for each type of damage to the exterior of the vehicle (S450), and accordingly, whether the exterior of the vehicle has been damaged and the type of damage may be determined (S460). In addition, whether the exterior of the vehicle has been damaged and the type of damage determined according to one embodiment of the present disclosure may include the states of normal, scratched, dented, cracked, and opened.

In this regard, the predetermined area including the area with the high possibility of damage to the exterior of the vehicle and the area where the exterior of the vehicle has been impacted may be learned via the deep learning model according to one embodiment of the present disclosure, and may be learned by accumulating the difference with the probability map on whether the exterior of the vehicle has been damaged and the type of damage determined via the image provided from the former user of the vehicle.

The camera of the mobile terminal of the present disclosure may include the ToF camera, and the depth image may be captured via the ToF camera. Therefore, the exterior image of the vehicle, including both the RGB image and the depth image, may be input to the deep learning model. In addition, the deep learning model may be trained based on damage characteristics information.

Therefore, a depth of the scratch or the dent in the exterior of the vehicle may be determined in determining the type of damage of the vehicle. In addition, the number of scratches or dents that may occur in the same area of the exterior of the vehicle may also be determined.

In addition, the deep learning model of the present disclosure may extract the difference between the masking in the pixel units and the probability map on whether the exterior of the vehicle has been damaged and the type of damage determined as the damage characteristics information via a loss function, and trained based on the damage characteristics information. Therefore, the exterior image of the vehicle captured by the former user of the vehicle via the mobile terminal may be stored as the second exterior image, and whether the exterior of the vehicle has been damaged and the type of damage determined may be learned to determine whether the exterior of the vehicle has been damaged and the type of damage using the first exterior image captured by a current user via the mobile terminal.

In FIG. 5 is an example showing areas 510 and 520 where the damages have occurred on the exterior of the vehicle. Guide information that guides the areas 510 and 520 where the damages have occurred on the exterior of the vehicle to be captured via the camera of the mobile terminal of the present disclosure may be output. The output guide information may include information on whether the areas 510 and 520 where the damages have occurred on the exterior of the vehicle are contained in the area captured by the camera or information on whether the captured image may be stored as the first exterior image.

In FIG. 5 is an example showing areas 530 and 540 masked by matching the first exterior image and the second exterior image with each other and detecting the areas 510 and 520 where the damages have occurred from the matched image via the deep learning model of the present disclosure. The first exterior image including both the RGB image and the depth image and the second exterior image may be input to the deep learning model to match the first exterior image and the second exterior image with each other, and the masking may be performed in the pixel units in the matched image. In addition, as described above, whether the exterior of the vehicle has been damaged and the type of damage may be determined. In addition, a depth or the number of cracks or dents may be determined via the acquisition of the depth image via the ToF camera.

Furthermore, the vehicle exterior damage determination service providing method according to one embodiment of the present disclosure may be utilized in all situations in which the user for the same vehicle is changed, as well as the rental or valet service. For example, an exterior image acquired by capturing a vehicle to be purchased in a used car market via the camera of the mobile terminal and an existing image may be input to the deep learning model to determine whether the exterior of the vehicle has been damaged and the type of damage. Even in this case, the guide information for the area with the high possibility of damage to the exterior of the vehicle or the area where the exterior of the vehicle has been impacted may be output to guide the capturing of the user who wants to purchase the used car. In addition, even when purchasing a new car, the present disclosure may be used to determine whether the new car has any abnormality on the exterior.

Figure 6:
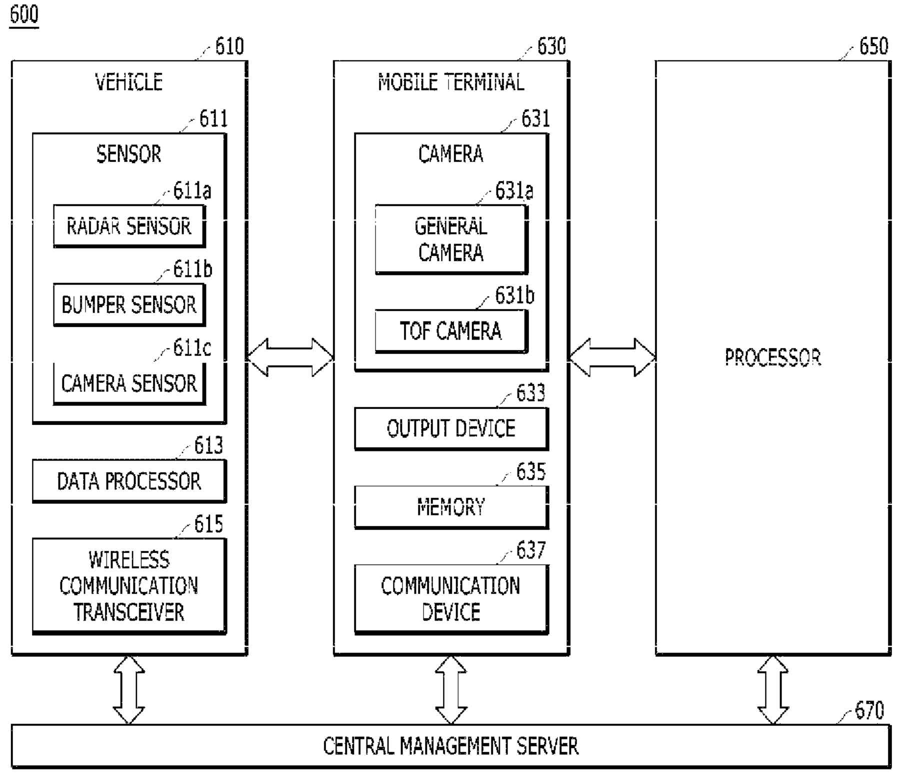
FIG. 6 is a block diagram of a vehicle exterior damage determination service providing system according to an embodiment of the present disclosure.

FIG. 6 is a block diagram of a vehicle exterior damage determination service providing system according to an embodiment of the present disclosure.

In a vehicle exterior damage determination service providing system 600 of the present disclosure, a vehicle 610 may include a sensor 611, a data processor 613, and a wireless communication transceiver 615. In addition, the mobile terminal 630 may include a camera 631, an output device 633, a memory 635, and a communication device 637.

The sensor 611 may include a radar sensor 611*a*, a bumper sensor 611*b*, and a camera sensor 611*c*. in this regard, information on an area with a high possibility of damage to an exterior of the vehicle 610 may be acquired by measuring an area where a distance to an external object measured during travel of the vehicle 610 via the radar sensor 611*a* and the camera sensor 611*c* is equal to or smaller than the reference distance. In addition, information on an area where the exterior of the vehicle 610 has been impacted may be acquired via the bumper sensor 611*b*.

The area with the high possibility of damage to the exterior of the vehicle 610 and the area where the exterior of the vehicle 610 has been impacted acquired via the sensor 611 of the vehicle 610 may be processed via the data processor 613 as information on the predetermined area of the present disclosure. In addition, the predetermined area may be processed as the guide information of the present disclosure via the data processor 613.

In addition, the area with the high possibility of damage to the exterior of the vehicle 610 and the area where the exterior of the vehicle 610 has been impacted may be transmitted to the mobile terminal 630 via the wireless communication transceiver 615.

The camera 631 of the mobile terminal 630 may include a general camera 631*a* and a ToF camera 631*b*. An exterior image of the vehicle 610 may be captured via the camera 631 of the mobile terminal 630. The exterior image of the vehicle 610 captured via the camera 631 of the mobile terminal 630 may include the RGB image or the depth image.

A depth of a scratch or a dent in the exterior of the vehicle 610 may be determined in determining a type of damage to the vehicle 610 by capturing the depth image of the vehicle 610 via the ToF camera 631*b* of the mobile terminal 630 according to one embodiment of the present disclosure. In addition, the number of scratches or dents that may occur in the same area of the exterior of the vehicle 610 may be determined.

The output device 633 of the mobile terminal 630 may output the guide information that guides the predetermined area to be captured via the camera 631 of the mobile terminal 630. In addition, whether the exterior of the vehicle 610 has been damaged and the type of damage determined may be output. The output device 633 of the mobile terminal 630 may include the display for outputting the screen and the sound output device for outputting the sound. In addition, the exterior image of the vehicle 610 captured via the camera 631 of the mobile terminal 630 may be stored in a memory 635.

A processor 650 including the deep learning model of the present disclosure may receive a first exterior image of the vehicle 610 captured based on the output guide information and a second exterior image of the vehicle 610 stored in advance, match the first exterior image and the second exterior image with each other, detect the predetermined area from the matched image and mask the corresponding area, and determine whether the exterior of the vehicle 610 has been damaged and the type of damage based on the masked area. In this regard, whether the exterior of the vehicle has been damaged and the type of damage may include the states of normal, scratched, dented, cracked, and opened.

In addition, the exterior damage determination service providing system 600 of the vehicle 610 of the present disclosure may include a central management server 670 that transmits whether the exterior of the vehicle 610 has been damaged and the type of damage determined via the wireless communication.

Accordingly, the method and the system for providing the vehicle exterior damage determination service of the present disclosure may output the guide information that guides the predetermined area to be captured via the camera of the mobile terminal to allow the driver of the vehicle to capture the exterior of the vehicle based on the output guide information, and input the captured exterior image of the vehicle and the exterior image of the vehicle stored in advance to the deep learning model to determine whether the exterior of the vehicle has been damaged and the type of damage via the matching of the images.

In addition, the method and the system for providing the vehicle exterior damage determination service of the present disclosure may output, on the mobile terminal, the area with the high possibility of damage to the exterior of the vehicle or the area where the exterior of the vehicle has been impacted acquired via the sensor of the vehicle during the travel of the vehicle to guide the capturing of the image for checking whether there is any abnormality on the exterior of the vehicle.

Furthermore, the method and the system for providing the vehicle exterior damage determination service of the present disclosure may be utilized in all of the situations in which the user for the same vehicle is changed, as well as the rental or valet service. For example, the exterior image acquired by capturing the vehicle to be purchased in the used car market via the camera of the mobile terminal and the existing image may be input to the deep learning model to determine whether the exterior of the vehicle has been damaged and the type of damage. Even in this case, the guide information for the area with the high possibility of damage to the exterior of the vehicle or the area where the exterior of the vehicle has been impacted may be output to guide the capturing of the user who wants to purchase the used car. In addition, even when purchasing the new car, the present disclosure may be used to determine whether the new car has any abnormality on the exterior.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:

outputting guide information to guide an image to be captured of a predetermined area via a camera of a mobile terminal including a processor;

inputting a first exterior image of a vehicle, the first exterior image being captured based on the output guide information and a second exterior image of the vehicle stored in advance to a processor including a deep learning model;

matching the first exterior image and the second exterior image with each other to acquire a matched image;

masking a detected area from the predetermined image within the matched image as a masked area; and determining whether an exterior of the vehicle has been damaged and a type of damage based on the masked area, wherein the determining of whether the exterior of the vehicle has been damaged and the type of damage further comprises:

generating a probability map from the matched image via image segmentation;

determining whether the exterior of the vehicle has been damaged via the generated probability map; and performing masking in pixel units for each type of damage to extract the masking result as damage characteristics information.

2. The method of claim 1, wherein the guide information includes one or more of information on whether the predetermined area is contained in a first area captured by the camera and information on whether the predetermined area is recognized and stored as the first exterior image.

3. The method of claim 1, wherein the first exterior image input to the processor includes an RGB image and a depth image.

4. The method of claim 3, wherein the camera includes a time of flight (ToF) camera configured to capture the depth image.

5. The method of claim 1, wherein the predetermined area is one of a second area with a high possibility of damage to the exterior of the vehicle and a third area where the exterior of the vehicle has been impacted acquired via a sensor of the vehicle.

6. The method of claim 5, wherein the second area includes a fourth area where a distance to an external object measured during travel of the vehicle is less than or equal to a reference distance.

7. The method of claim 5, wherein the sensor of the vehicle comprises one or more of a radar sensor, a bumper sensor, and a camera sensor.

8. The method of claim 1, wherein the determination of whether the exterior of the vehicle has been damaged and the type of damage include states of normal, scratched, dented, cracked, and opened.

9. The method of claim 1, wherein the deep learning model is further trained based on the damage characteristics information.

10. The method of claim 1, further comprising:

outputting the determination of whether the exterior of the vehicle has been damaged and the determined type of damage via an output device of the mobile terminal.

11. The method of claim 10, wherein the outputting comprises transmitting the determination of whether the exterior of the vehicle has been damaged and the determined type of damage via a wireless communication transceiver.

12. An electronic system, the system comprising:

a camera mounted on a mobile terminal;

an output device configured to output guide information to guide a capture of a predetermined area via the camera; and a processor configured to:

input a first exterior image of a vehicle captured based on the output guide information and a second exterior image of the vehicle stored in advance to a deep learning model;

match the first exterior image and the second exterior image to acquire a matched image;

masking a detected area based on a match between the predetermined area and the matched image as a masked area; and determine whether an exterior of the vehicle has been damaged and a type of damage based on the masked area, wherein the determining of whether the exterior of the vehicle has been damaged and the type of damage further comprises:

generating a probability map from the matched image via image segmentation;

determining whether the exterior of the vehicle has been damaged via the generated probability map; and performing masking in pixel units for each type of damage to extract the masking result as damage characteristics information.

13. The system of claim 12, wherein the guide information includes one or more of information on whether the predetermined area is contained in a first area captured by the camera and information on whether the predetermined area is recognized and stored as the exterior image of the vehicle.

14. The system of claim 12, wherein the first exterior image input to the processor includes an RGB image and a depth image, and wherein the camera includes a time of flight (ToF) camera configured to capture the depth image.

15. The system of claim 12, wherein the predetermined area is one of a second area with a high possibility of damage to the exterior of the vehicle and a third area where the exterior of the vehicle has been impacted acquired via a sensor of the vehicle.

16. The system of claim 15, wherein the second area includes a fourth area where a distance to an external object measured during travel of the vehicle is less than or equal to a reference distance.

17. The system of claim 12, wherein the determination of whether the exterior of the vehicle has been damaged and the type of damage include states of normal, scratched, dented, cracked, and opened.

18. The system of claim 12, wherein the deep learning model is trained based on the damage characteristics information.

19. The system of claim 12, further comprising:

a central management server configured to transmit the determination of whether the exterior of the vehicle has been damaged and the determined type of damage via a wireless communication transceiver.

20. The system of claim 12, wherein the output device is configured to output the determination of whether the exterior of the vehicle has been damaged and the determined type of damage.

21. A processor-implemented method, the method comprising:

outputting guide information to direct a motion of a camera of a mobile terminal including the processor to capture an of a predetermined area via;

training a machine learning model on a first exterior image of a vehicle, the first exterior image being captured based on the output guide information and a second exterior image of the vehicle, the second image being of an undamaged version of the vehicle;

masking an area from the first image that matches the second image; and determining whether an exterior of the vehicle has been damaged and a type of damage based on the masked area, wherein the determining of whether the exterior of the vehicle has been damaged and the type of damage further comprises:

generating a probability map from the matched image via image segmentation;

determining whether the exterior of the vehicle has been damaged via the generated probability map; and performing masking in pixel units for each type of damage to extract the masking result as damage characteristics information.

22. The method of claim 21, wherein the guide information is output via one of a voice command or display images.

* * * * *